(12) United States Patent
Veilleux, Jr.

(10) Patent No.: US 9,303,781 B2
(45) Date of Patent: Apr. 5, 2016

(54) HIGH GAIN SERVO VALVE

(71) Applicant: Hamilton Sundstrand Corporation, Windsor Locks, CT (US)

(72) Inventor: Leo J. Veilleux, Jr., Wethersfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 553 days.

(21) Appl. No.: 13/760,815

(22) Filed: Feb. 6, 2013

(65) Prior Publication Data

US 2014/0216245 A1    Aug. 7, 2014

(51) Int. Cl.
| | |
|---|---|
| F15B 5/00 | (2006.01) |
| F16K 31/128 | (2006.01) |
| F15B 13/042 | (2006.01) |
| F15B 13/043 | (2006.01) |

(52) U.S. Cl.
CPC ............... *F16K 31/128* (2013.01); *F15B 5/003* (2013.01); *F15B 13/0426* (2013.01); *F15B 13/0438* (2013.01); *Y10T 137/0379* (2015.04); *Y10T 137/7764* (2015.04)

(58) Field of Classification Search
CPC ...... F15B 5/003; F15B 13/043; F15B 13/0438
See application file for complete search history.

(56) References Cited

U.S. PATENT DOCUMENTS

| | | | | |
|---|---|---|---|---|
| 3,093,121 | A | * | 6/1963 | Murphy .......................... 91/367 |
| 3,455,330 | A | * | 7/1969 | Williams et al. ............... 137/596 |
| 3,473,548 | A | * | 10/1969 | Erickson et al. ................. 137/85 |
| 3,690,345 | A | * | 9/1972 | Ericson et al. ........... 137/625.62 |
| 5,027,858 | A | * | 7/1991 | Gold ........................ 137/625.62 |

* cited by examiner

*Primary Examiner* — Michael Leslie
(74) *Attorney, Agent, or Firm* — Cantor Colburn LLP

(57) ABSTRACT

A servo valve includes a movable throttling member positioned between a first opening and an opposing second opening, and a first inlet port and a second inlet port to convey a fluid flow toward the first and opening, respectively. A first inlet orifice, defined between the first inlet port and a first pressure reaction member, is located between and in fluid communication with the first inlet port and the first opening. A second inlet orifice, is located between and in fluid communication with the second inlet port and the second opening. The second pressure reaction member is secured to the first pressure reaction member at a substantially fixed distance. Each of the first inlet orifice and the second inlet orifice is variable via a change a pressure of the fluid flow downstream of the first inlet orifice and the second inlet orifice.

17 Claims, 2 Drawing Sheets

HIGH GAIN SERVO VALVE

BACKGROUND

The subject matter disclosed herein generally relates to fluid flow systems. More specifically, the subject disclosure relates to servo valves in fluid flow systems.

Servo valves are used, for example, in actuation systems where accurate positional control is required. Servo valves may also be used in other fluid flow systems, such as cooling systems or fuel systems. The servo valve utilizes an element, typically a flapper nozzle or a jet pipe to position the servo and regulate flow through the servo valve to control a position of an actuator, valve, or motor to which the servo valve is connected. The position of the flapper nozzle or jet pipe is, in turn, controlled by an electrical signal applied to a torque motor. Servo valves are advantageous because a low power electrical signal is utilized to position the servo and corresponding actuator, valve or motor. Servo valves are, however, complex and costly structures. Further, high pressure gain systems typically require use of the jet pipe type of servo valve over the flapper nozzle type, which is the more complex and costly option of the two. To utilize a flapper nozzle valve in a high gain application requires a decreased gap between the nozzle and flapper requiring closer tolerance manufacturing, and this decreased gap results in high impingement losses of fluid pressure impinging on the flapper as well as increased sensitivity to contamination.

BRIEF DESCRIPTION

In one embodiment, a servo valve includes a movable throttling member positioned between a first opening and an opposing second opening, and a first inlet port and a second inlet port to convey a fluid flow toward the first and second opening, respectively. A first inlet orifice, defined between the first inlet port and a first pressure reaction member, is located between and in fluid communication with the first inlet port and the first opening. A second inlet orifice, defined between the second inlet port and a second pressure reaction member, is located between and in fluid communication with the second inlet port and the second opening. The second pressure reaction member is secured to the first pressure reaction member at a substantially fixed distance. Each of the first inlet orifice and the second inlet orifice is variable via a change a pressure of the fluid flow downstream of the first inlet orifice and the second inlet orifice, resulting in a change in pressure of a fluid urged downstream.

In another embodiment, a method of operating a servo valve includes urging a first fluid flow through a first inlet port at an inlet pressure and urging a second fluid flow through a second inlet port at the inlet pressure. The first fluid flow is directed through a first variable inlet orifice defined by the first inlet port and a first pressure reaction member toward a first opening located at a first side of a throttling member, and the second fluid flow is directed through a second variable inlet orifice defined by the second inlet port and a second pressure reaction member toward a second opening located at an opposing side of the throttling member. The second pressure reaction member secured to the first pressure reaction member at a substantially fixed distance. A size of the first inlet orifice is increased via a change a pressure of the fluid flow downstream of the first inlet orifice and the second inlet orifice, resulting in a change in pressure of the first fluid flow urged downstream.

In yet another embodiment, an actuator system includes an actuator having an actuator piston and a valve spool in fluid communication with the actuator to urge movement of the actuator piston. A servo valve is in fluid communication with the valve spool and includes a movable throttling member positioned between a first opening and an opposing second opening and a first inlet port and a second inlet port to convey a fluid flow toward the first and second opening, respectively. A first inlet orifice is located between and in fluid communication with the first inlet port and the first opening, and is defined between the first inlet port and a first pressure reaction member. A second inlet orifice is located between and in fluid communication with the second inlet port and the second opening, and is defined between the second inlet port and a second pressure reaction member. The second pressure reaction member is secured to the first pressure reaction member at a substantially fixed distance. Each of the first inlet orifice and the second inlet orifice is variable via a change a pressure of the fluid flow downstream of the first inlet orifice and the second inlet orifice, resulting in a change in pressure of a fluid urged to the valve spool.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
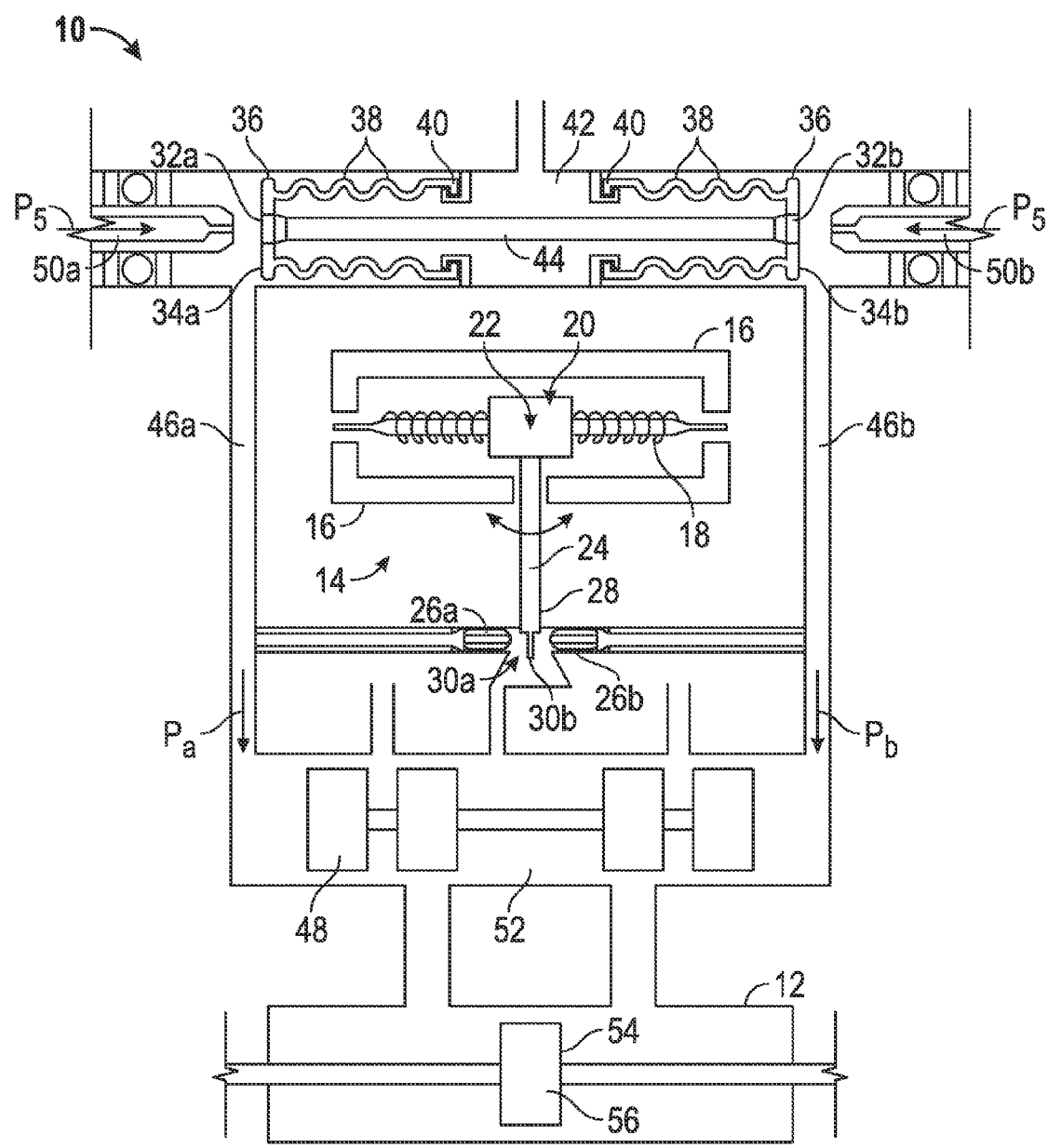
FIG. 1 is a schematic view of an embodiment of a servo valve.

Shown in the FIG. 1 is schematic view of an embodiment of a servo valve 10. The servo valve 10 of the Figure is shown connected to an actuator 12. It is to be appreciated, however, that the servo valve 10 may similarly be connected to another component requiring valving, such as a fuel system valve or a motor. The servo valve 10 may be part of a system through which any fluid, such as fuel, oil, water or other fluid, flows.

The servo valve 10 includes a torque motor 14, including two permanent magnets 16 with a coil winding 18 attached to a magnetically permeable armature 20. The armature 20 is fixed at an armature pivot 22, with a throttling member, for example, flapper 24 extending from the armature 20. The servo valve 10 further includes a first and second opening, flapper nozzles 26a and 26b, with one of flapper nozzles 26a and 26b located at each lateral side 28 of the flapper 24. The flapper nozzles 26a and 26b are located with a flapper nozzle gap 30a and 30b, respectively, to the flapper 24. Input ports 50a and 50b are located upstream of flapper nozzles 26a and 26b. A fluid flow at supply pressure $P_s$ is provided through the input ports 50a and 50b and is directed at pressure reaction members, for example, bellows 34a and 34b, respectively, with an input orifice 32a and 32b located between respective input ports 50a, 50b and bellows 34a, 34b. It is to be appreciated that while bellows 34a and 34b are shown in this embodiment, one skilled in the art would appreciate that in other embodiments, other flow pressure reaction members, such as diaphragms, pistons or the like may be used to define the variable input orifices 32a and 32b. The bellows 34a, 34b comprise a bellows face 36 and a plurality of convolutions 38 extending from the bellows face 36 toward a fixed end 40 of the bellows 34a and 34b. The bellows 34a and 34b are located in a bellows chamber 42 and fixed at the fixed end 40 by, for example, a retainer and seal arrangement to prevent flow around the bellows 34a, 34b Further, the bellows 34a and 34b are connected with, for example, a tie rod 44, such that a distance between bellows face 36 is fixed. Spool lines 46a and 46b extend from orifice 32a and 32b, respectively, and are in fluid communication with flapper nozzles 26a and 26b and also with valve spool 48 located in spool chamber 52. Spool lines 46a and 46b operate at pressures $P_a$ and $P_b$, respectively.

In operation, as long as the flapper 24 is centered between the flapper nozzles 26a and 26b with flapper nozzle gaps 30a and 30b equal, the servo valve 10 is in force balance and $P_a$ equals $P_b$. When a current is applied to the coil winding 18, a magnetic flux is generated in the permanent magnets 16 causing the armature 20 and flapper 24 to rotate about the armature pivot 22 in a direction depending on a direction of the magnetic flux.

Figure 2:
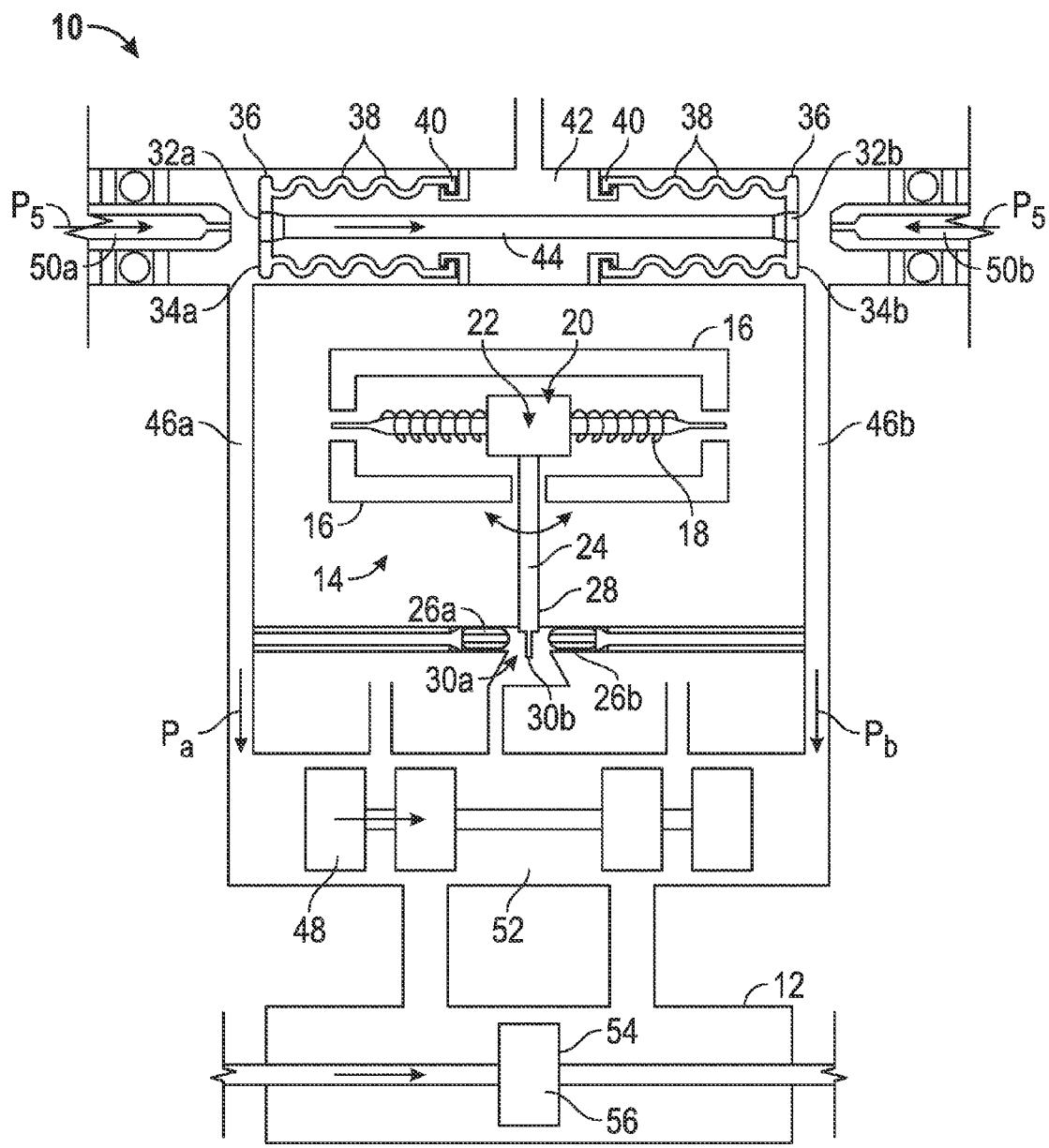
FIG. 2 is a schematic view of an embodiment of a servo valve when current is applied to a torque motor of the servo valve.

In one embodiment, referring to FIG. 2, the applied current causes the flapper 24 to rotate clockwise, causing the flapper nozzle gap 30a to be smaller than flapper nozzle gap 30b. This, in turn, causes $P_a$ to be greater than $P_b$, shifting the valve spool 48 position to be shifted to the right. This, in turn increases pressure supplied to a first side 54 of actuator piston 56, driving the actuator piston to the right. Similarly, current causing counterclockwise rotation of the flapper 24 about the armature pivot 22 results in the valve spool 48 position to be shifted to the left. The bellows 34a and 34b are configured to amplify the difference in pressure caused by the unequal flapper gaps 30a and 30b. A closure of gap 30a increases pressure $P_a$ through spool line 46a up to and including at input orifice 32a. This forces bellows face 36 away from input port 50a, compressing the bellows 34a, thus increasing the input orifice 32a size. This results in greater flow through spool line 46a, which further increases $P_a$, relative to $P_b$. $P_b$, on the other hand decreases relative to $P_a$ as bellows face 36a is forced nearer to input port 50b, thereby decreasing pressure $P_b$ in spool leg 46$_b$. The increased difference between $P_a$ and $P_b$ drives movement of the valve spool 48 in this embodiment, to the right of FIG. 2, which in turn may drive movement of actuator piston 56.

A method of operating the servo valve 10 includes urging a first fluid flow through a first inlet port 50a at the inlet pressure, $P_s$, while a second fluid flow is urged through the second inlet port 50b at the inlet pressure, $P_s$, which in some embodiments is equal to the inlet pressure at first inlet port 50a. The first fluid flow is directed through the first variable inlet orifice 32a defined by the first inlet port 50a and the bellows face 36 of the first bellows 34a, toward the first flapper nozzle 26a disposed at a first side of the flapper 24. Similarly, the second fluid flow is directed through the second variable inlet orifice 32b defined by the second inlet port 50b and the bellows face 36 of the second bellows 34b toward the second flapper nozzle 26b disposed at an opposing side of the flapper 24. A change in the pressure $P_a$ downstream of the first inlet orifice 32a by, for example, moving the flapper 24a closer to flapper nozzle 26a, results in a change in pressure $P_a$ of the first fluid flow urged downstream.

Thus a small change in flapper gaps 30a and 30b is translated into a larger difference between $P_a$ and $P_b$ than would be achieved without the inclusion of the bellows 34a and 34b. This increase in gain, or increased pressure difference with applied current, is achieved in this embodiment without the inclusion of a prior art jet pipe nozzle applied to fixed orifices, which is costly and complex and results in a high degree of impingement losses. Rather the result is achieved via the relatively low cost and low complexity of the bellows and tied rod arrangement which provides passive variable control by creating variable orifices 32a and 32b.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A servo valve comprising:
    a movable throttling member disposed between a first opening and an opposing second opening;
    a first inlet port and a second inlet port to convey a fluid flow toward the first and second opening, respectively;
    a first inlet orifice disposed between and in fluid communication with the first inlet port and the first opening, the first inlet orifice defined between the first inlet port and a first pressure reaction member; and
    a second inlet orifice disposed between and in fluid communication with the second inlet port and the second opening, the second inlet orifice defined between the second inlet port and a second pressure reaction member, the second pressure reaction member secured to the first pressure reaction member at a substantially fixed distance;
    wherein each of the first inlet orifice and the second inlet orifice is variable via a change in a pressure of the fluid flow downstream of the first inlet orifice and the second inlet orifice, resulting in a change in pressure of a fluid urged downstream;
    wherein the first pressure reaction member and the second pressure reaction member are a first and second bellows.

2. The servo valve of each claim 1, wherein each bellows of the first and second bellows includes:
    a fixed end secured in a bellows chamber;
    a bellows face disposed at the first or second inlet port to define the first or second inlet orifice; and
    a plurality of convolutions extending between the fixed end and the bellows face.

3. The servo valve of claim 2, wherein the bellows face of the first bellows is connected to the bellows face of the second bellows via a tie rod.

4. The servo valve of claim 2, wherein the first bellows and second bellows are fixed via a retainer and seal arrangement to prevent flow around the first bellows and second bellows.

5. The servo valve of claim 1, further comprising:
    a valve spool; and
    the first spool line and the second spool line in fluid communication with the first inlet orifice and the second inlet orifice, respectively;
    wherein a difference in a first fluid pressure of a first spool line and a second fluid pressure of a second spool line urges movement of the valve spool.

6. The servo valve of claim 1, wherein in the throttling member is a flapper rotatable about a flapper pivot.

7. The servo valve of claim 6, wherein the movable flapper is in magnetic communication with a torque motor to urge movement of the flapper.

8. The servo valve of claim 1, wherein at least one of the first opening and the second opening is a flapper nozzle.

9. A method of operating a servo valve comprising:
   urging a first fluid flow through a first inlet port at an inlet pressure;
   urging a second fluid flow through a second inlet port at the inlet pressure;
   directing the first fluid flow through a first variable inlet orifice defined by the first inlet port and a first pressure reaction member toward a first opening disposed at a first side of a throttling member;
   directing the second fluid flow through a second variable inlet orifice defined by the second inlet port and a second pressure reaction member toward a second opening disposed at an opposing side of the throttling member, the second pressure reaction member secured to the first pressure reaction member at a substantially fixed distance; and
   increasing a size of the first inlet orifice via a change in pressure of the fluid flow downstream of the first inlet orifice and the second inlet orifice, resulting in a change in pressure of the first fluid flow urged downstream;
   wherein the first pressure reaction member and the second pressure reaction member are a first bellows and a second bellows.

10. The method of claim 9, wherein increasing a size of the first inlet orifice comprises compressing the first bellows via increased pressure at the first inlet orifice.

11. The method of claim 9, wherein the first bellows and the second bellows are connected via a tie rod.

12. The method of claim 9, wherein the throttling member is a movable flapper rotatable about a flapper pivot.

13. The method of claim 12, further comprising:
   energizing an electrical coil in magnetic communication with the movable flapper;
   rotating the movable flapper about the flapper pivot in response to a magnetic field generated by energizing the coil; and
   decreasing a first opening gap between the flapper and the first opening via the rotation, thereby increasing the pressure downstream of the first inlet orifice.

14. A actuator system comprising:
   an actuator having an actuator piston;
   a valve spool in fluid communication with the actuator to urge movement of the actuator piston; and
   a servo valve in fluid communication with the valve spool including:
      a movable throttling member disposed between a first opening and an opposing second opening;
      a first inlet port and a second inlet port to convey a fluid flow toward the first and second opening, respectively;
      a first inlet orifice disposed between and in fluid communication with the first inlet port and the first opening, the first inlet orifice defined between the first inlet port and a first pressure reaction member; and
      a second inlet orifice disposed between and in fluid communication with the second inlet port and the second opening, the second inlet orifice defined between the second inlet port and a second pressure reaction member, the second pressure reaction member secured to the first pressure reaction member at a substantially fixed distance;
      wherein each of the first inlet orifice and the second inlet orifice is variable via a change in a pressure of the fluid flow downstream of the first inlet orifice and the second inlet orifice, resulting in a change in pressure of a fluid urged to the valve spool;
      wherein the first pressure reaction member and the second pressure reaction member are a first and second bellows.

15. The actuator system of each claim 14, wherein each bellows of the first and second bellows includes:
   a fixed end secured in a bellows chamber;
   a bellows face disposed at the first or second inlet port to define the first or second inlet orifice; and
   a plurality of convolutions extending between the fixed end and the bellows face.

16. The actuator system of claim 15, wherein the first bellows and second bellows are fixed via a retainer and seal arrangement to prevent flow around the first bellows and second bellows.

17. The actuator system of claim 14, wherein at least one of the first opening and the second opening is a flapper nozzle.

* * * * *